US006263929B1

(12) United States Patent
Aziz et al.

(10) Patent No.: US 6,263,929 B1
(45) Date of Patent: Jul. 24, 2001

(54) DOWEL MAKER

(75) Inventors: Abdul Aziz, Kanata; Leonard G. Lee, Almonte; Lloyd Sevack, Nepean, all of (CA)

(73) Assignee: Lee Valley Tools Ltd., Ottawa (CA)

( * ) Notice: Subject to any disclaimer, the term of this patent is extended or adjusted under 35 U.S.C. 154(b) by 0 days.

(21) Appl. No.: 09/383,692

(22) Filed: Aug. 26, 1999

(51) Int. Cl.[7] .............................. B23B 5/12; B27C 5/08; B27C 7/00

(52) U.S. Cl. ................................ 142/31; 142/29; 30/495

(58) Field of Search ................................ 142/29, 31, 32, 142/45, 46, 54, 56; 144/4, 8, 12, 18, 205, 206; 30/495

(56) References Cited

U.S. PATENT DOCUMENTS

| | | | |
|---|---|---|---|
| 2,734 | 7/1842 | Briggs . | |
| 11,349 | 7/1854 | Bailey et al. . | |
| 15,530 | 8/1856 | Smith . | |
| 17,175 | 4/1857 | Stevens . | |
| 60,985 | 1/1867 | Young . | |
| 76,205 | 3/1868 | Kraus . | |
| 101,315 | 3/1870 | Sanders . | |
| 117,786 | 8/1871 | Kniffen . | |
| 139,028 * | 5/1873 | Smiley et al. | 142/31 |
| 151,828 | 6/1874 | Benham . | |
| 166,674 | 8/1875 | Wood . | |
| 220,442 | 10/1879 | Stearns . | |
| 271,753 | 2/1883 | Whitsett . | |
| 272,073 | 2/1883 | Miles . | |
| 350,394 | 10/1886 | Ranney . | |
| 352,721 | 11/1886 | Traut . | |
| 353,761 | 12/1886 | Rush . | |
| 374,773 | 12/1887 | Bradford . | |
| 473,231 | 4/1892 | Leffel . | |
| 475,560 | 5/1892 | Heydenreich . | |
| 476,312 | 6/1892 | Resche . | |

(List continued on next page.)

FOREIGN PATENT DOCUMENTS

| | | |
|---|---|---|
| 133531 | 6/1929 | (CH) . |
| 293770 | 3/1915 | (DE) . |
| 313237 | 4/1989 | (EP) . |
| 1040092 | 10/1953 | (FR) . |
| 2535635 | 5/1984 | (FR) . |
| 3726 | 12/1869 | (GB) . |
| 15652 | 8/1892 | (GB) . |
| 557335 | 11/1943 | (GB) . |
| 96710 | 6/1982 | (JP) . |
| 154709 | 6/1993 | (JP) . |
| 1159724 | 6/1985 | (RU) . |
| 1766653 | 10/1992 | (RU) . |
| 81021 | 7/1934 | (SE) . |
| 369980 | 4/1973 | (SU) . |

OTHER PUBLICATIONS

*Jack Hill's Country Chair Making* by Jack Hill (Sterling 1998) pp. 28 and 29.

(List continued on next page.)

*Primary Examiner*—Steven C. Bishop
(74) *Attorney, Agent, or Firm*—John S. Pratt; Kilpatrick Stockton LLP

(57) ABSTRACT

A dowel maker having a first rough-sizing blade attached to a body with a micro-adjust assembly for adjusting blade position and a second finish-cutting blade also attached to a body with a micro-adjust assembly for adjusting blade position. Dowel diameters smaller than the largest diameter the body can accommodate may be produced using interchangeable front insert guides, and interchangeable rear guides are also used for different diameter dowels. A workpiece with a square cross-section end is driven through the dowel maker with a square recess socket driven by an electric hand drill.

41 Claims, 7 Drawing Sheets

U.S. PATENT DOCUMENTS

| | | | | |
|---|---|---|---|---|
| 481,469 | | 8/1892 | Bruner . | |
| 539,954 | | 5/1895 | Kay . | |
| 617,441 | | 1/1899 | Kelly . | |
| 619,159 | * | 2/1899 | Fosby | 142/56 |
| 622,794 | | 4/1899 | Brodhage . | |
| 690,339 | | 12/1901 | Wood . | |
| 887,148 | * | 5/1908 | Tannewitz | 142/31 |
| 896,579 | | 8/1908 | Richmond . | |
| 1,029,503 | | 6/1912 | Lumello . | |
| 1,494,897 | | 5/1924 | Freye . | |
| 1,538,987 | * | 5/1925 | Gullholm | 142/56 |
| 1,694,685 | | 12/1928 | Hein . | |
| 1,744,697 | * | 1/1930 | Granger | 142/54 |
| 1,750,394 | | 3/1930 | Dumont . | |
| 2,000,789 | | 5/1935 | Reis . | |
| 2,027,139 | | 1/1936 | Abramson et al. . | |
| 2,049,685 | * | 8/1936 | Brown | 142/56 |
| 2,062,257 | | 11/1936 | Douglas et al. . | |
| 2,529,018 | * | 11/1950 | Hancharik | 142/31 |
| 2,549,141 | | 4/1951 | Taylor . | |
| 2,556,415 | | 6/1951 | Buck . | |
| 2,597,099 | | 5/1952 | Hayhurst . | |
| 2,681,086 | | 6/1954 | Degen . | |
| 2,748,817 | | 6/1956 | Stearns . | |
| 2,764,187 | | 9/1956 | Zemrowski . | |
| 2,978,002 | | 4/1961 | Ransom . | |
| 3,053,118 | | 9/1962 | Lavallee . | |
| 3,118,476 | | 1/1964 | Fiore . | |
| 3,130,763 | | 4/1964 | Schlosser et al. . | |
| 3,229,731 | | 1/1966 | Hilton . | |
| 3,234,974 | * | 2/1966 | Ray | 142/32 |
| 3,277,932 | | 10/1966 | Rouse . | |
| 3,973,862 | | 8/1976 | Segal . | |
| 4,077,737 | | 3/1978 | Morse . | |
| 4,295,763 | | 10/1981 | Cunniff . | |
| 4,452,554 | | 6/1984 | Hougen . | |
| 4,460,532 | | 7/1984 | Cornell . | |
| 4,553,575 | | 11/1985 | Brown . | |
| 4,573,838 | | 3/1986 | Omi et al. . | |
| 4,595,321 | | 6/1986 | Van Dalen . | |
| 4,630,660 | | 12/1986 | McGuire . | |
| 4,758,120 | | 7/1988 | Bijl . | |
| 4,767,244 | | 8/1988 | Peterson . | |
| 4,767,245 | | 8/1988 | Shoji et al. . | |
| 4,768,903 | | 9/1988 | Merritt, Jr. . | |
| 4,770,215 | | 9/1988 | Hsieh . | |
| 4,798,503 | | 1/1989 | Huju . | |
| 5,025,842 | | 6/1991 | Brimhall . | |
| 5,127,452 | | 7/1992 | Wilston . | |
| 5,213,456 | | 5/1993 | Lee . | |
| 5,353,507 | | 10/1994 | Lee et al. . | |
| 5,401,125 | | 3/1995 | Sevack et al. . | |
| 5,503,200 | * | 4/1996 | Lea | 142/56 |
| 5,645,117 | | 7/1997 | Wirth, Jr. et al. . | |

OTHER PUBLICATIONS

Operating Instructions from Woodcraft Supply Corp. for German dowel maker, series 14L22, which was sold in the United States prior to Mar. 3, 1997, together with seven (7) photographs.

Seven (7) photographs of antique Stanley No. 77 Dowel Maker machine, including cutter head, cutter or blade admitted prior art.

Two (2) photographs of an antique tenon–former with funnel–shaped workpiece receiving structure admitted prior art.

Two (2) photographs of an antique adjustable diameter tenon–former admitted prior art.

*Trend Routing Technology* Catalog, p. 43, admitted prior art.

Catalog *Woodworkers Supply, Inc.* (Aug., 1993).

Tool and Manufacturing Engineers Handbook, Fourth Edition, vol. 1, Machining, Society of Manufacturing Engineers, 1983, chapter 9, pp. 14–15.

* cited by examiner

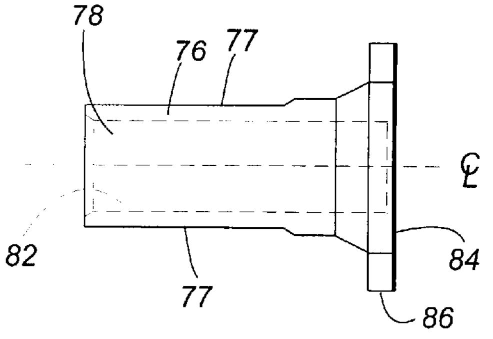
FIG. 15
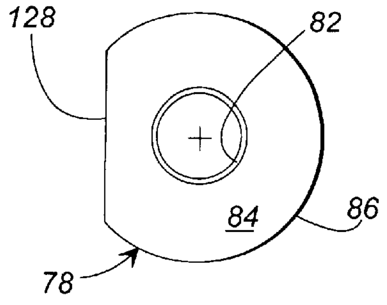
FIG. 17
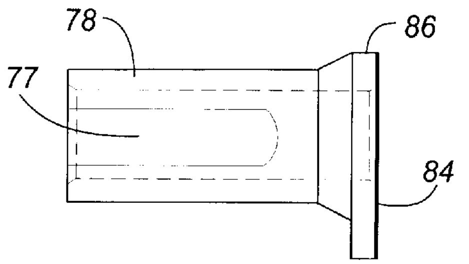
FIG. 16
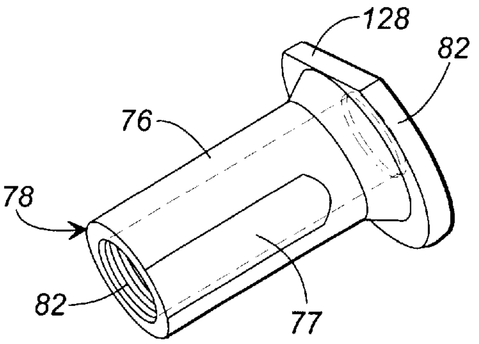
FIG. 18
FIG. 19
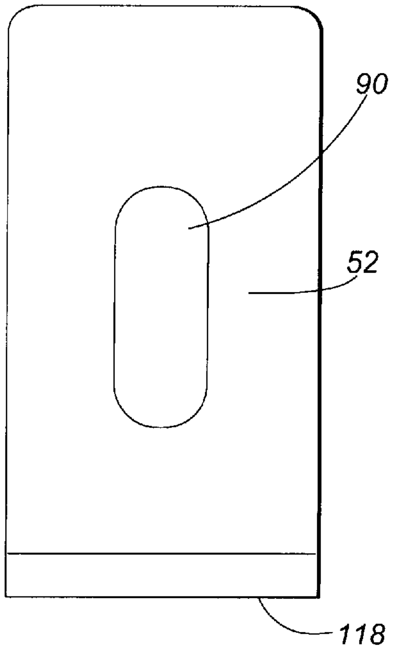

DOWEL MAKER

FIELD OF THE INVENTION

This invention relates to the manufacture of wooden dowels and to devices for doing so.

BACKGROUND OF THE INVENTION

Wooden dowels in a wide variety of species of woods arc widely utilized for structural and decorative purposes in woodworking. Because of this, a large variety of techniques have been developed for producing dowels, and commercially produced dowels are widely available.

Commercial dowel production equipment, like the machine described in U.S. Pat. No. 4,770,215, is, however, complex and expensive, and commercially produced dowels vary wildly from their intended nominal diameters, are often oval rather than round in cross-section, and are available in a limited number of species of wood.

As a result, there continues to be a need for relatively inexpensive equipment capable of producing accurately sized dowels in multiple sizes and wood species, in home workshops and small commercial workshops, despite numerous prior efforts to develop such techniques and equipment. Among these prior efforts arc U.S. Pat. Nos. 5,127,452 and 4,553,575, a German dowel maker sold by Woodcraft Supply and the Fred Lambert "rounders" system described in *Jack Hill's Country Chair Making* by Jack Hill (Sterling 1998). Some prior devices drive a spinning workpiece through or past a stationary cutter, such as U.S. Pat. No. 4,553,575, or a spinning Cutter, such as U.S. Pat. No. 4,768,903. Others rotate a cutter about a non-rotating workpiece, as in the Stanley No. 77 dowel making machine, which rotates a cutter with a straight section and a curved section about a square cross section workpiece that is fed into the rotating cutter head without rotating the workpiece.

Virtually all prior small shop dowel making devices have utilized a single cutter blade, some of which blades have a straight cutting arris (the "edge" foxined by the intersection of the bevels that cause the cutter to be sharp) and others of which have a curved or partially curved cutting arris. This is problematic because there is always a trade-off between the "quantity" of a cut, i.e., the amount of material that a blade removes, and the quality of the surface produced by the cut.

Another problem in the art results from the manner in which cutter blades are secured in the tool in which they are used. Fixed cutter blades in woodworking tools must usually be held very firmly in order to function successfully without chattering or other problems. This is typically accomplished by clamping the blade against a fixed, substantial bed with one or more bolts that pass through one or more holes or slots in the blade or with a lever or clamping arrangement such as is used in some hand planes. These arrangements usually permit blade adjustment within the plane of the blade, by pivoting or sliding the blade relative to the bed against which it rests. However, adjustment of a blade normal to its plane and the plane of the bed against which it rests is rarely possible because it requires that the blade bed move relative to the rest of the tool. In a very different context, some bench planes make this possible with a movable frog, but prior art dowel makers have not had such capability.

SUMMARY OF THE INVENTION

This invention is a relatively inexpensive device capable of producing extremely high-quality dowels in a variety of different diameters, including common nominal diameters between, for instance, ¼ inch and one inch, and it enables the user to adjust the diameter of the dowel produced with great accuracy. This is particularly desirable because different species of wood, and wood having different moisture contents, exhibit varying quantities of fiber spring back, with the result that a dowel making machine with a given component setting will produce different dowel diameters in different species of wood or in samples of a particular species having different moisture contents.

This machine uses two fixed cutters attached to a machine body. A typically, but not necessarily, square cross-section workpiece from which dowel is to be produced is driven through the machine while spinning it with a hand electric drill or other motor that engages the workpiece with a square wrench socket chucked in the drill or attached to the motor. The workpiece enters a member that guides the workpiece, which may be a bore in the body, or a bore in an interchangeable insert guide secured in the body of the dowel maker. In either case, the entrance bore in the body or in the insert guide must be large enough to accommodate the square (or other shape) cross-section workpiece. The workpiece is driven against a single-bevel first blade which has a rounded trailing corner and is positioned in an opening communicating with the bore in the body or insert guide to take an aggressive cut to preliminary convert the square stock to an oversize, roughly round dowel. This oversize dowel section then proceeds to engage a second single-bevel blade having a straight cutting arris (formed by the intersection of the back of the blade and the sharpening bevel) that is positioned to take a fine, shearing cut, which shaves the dowel to the exact desired diameter with an extremely smooth surface before it passes into an outfeed guide secured in the body.

Each blade is mounted on a micro-adjustment assembly with a screw that passes through a slot in the blade and into the assembly. The presence of the slot makes it possible for the blade position to be adjusted within the plane of the back of the blade by sliding the blade relative to the screw in the slot. Significantly, the micro-adjust assembly makes it possible to move the blade normal to the plane within which it rests, along the longitudinal axis of the blade securing screw, which is generally (but not precisely) normal to the longitudinal axis of the insert guide and workpiece. This enables the blades to be positioned very accurately to produce a particular dowel diameter and to reposition them for different dowel diameters using interchangeable front insert and rear guides while maintaining essentially the same relationship between the blades and the workpieces throughout the range of diameters of dowel that can be produced.

The micro-adjust assembly securing the first or front blade in the body holds it at an acute angle to the longitudinal axis of the guides, which is the longitudinal and rotating axis of the workpiece and dowel that is produced. The first blade may be positioned, for instance, with its planar back surface tilted approximately 10° (from vertical) and pivoted approximately 22.5° (horizontally) from the longitudinal axis, and by pivoting or leaning it forward within the plane of the blade (thereby raising the curved, trailing corner of the first blade) approximately 15 degrees. This causes the straight portion of the cutting arris of the first blade to lie at a compound angle 26.57 degrees relative to the longitudinal axis of the workpiece (the longitudinal axis of the front micro-adjust assembly forms a 9.25 degree angle relative to vertical and a 67.56 degree angle relative to the longitudinal axis) and positions the front blade to take an aggressive cut that reduces the workpiece to a diameter approximately 0.060" to 0.075" greater than the desired finish diameter, completing this first cut with the rounded trailing comer of the first blade.

The micro-adjust assembly securing the second or rear blade in the body holds it tilted back, or pivoted within the plane of the back of the blade, approximately 20°, but with the back of the single bevel cutter parallel or approximately parallel to the longitudinal axis. In this position the rear blade can take a light shearing cut from the workpiece, reducing its diameter by approximately 0.060" to 0.075", to produce a very smooth, accurately sized dowel.

It is thus among the objects of this invention to provide a dowel making machine and dowel making techniques sufficiently simple and inexpensive to be practical for use in home or small commercial woodworking shops, that produce accurately sized, round dowels with high quality, smooth surfaces in a large number of sizes in a wide variety of species. The manner in which this invention achieves these and other objectives will be apparent from the following description of the invention, the accompanying drawings and the following claims.

BRIEF DESCRIPTION OF THE DRAWINGS

FIGS. 15, 16, 17 and 18 are top plan, side elevation, front and perspective views, respectively, of the bush portion of the blade adjustment assemblies of the dowel maker shown in FIG. 1.

FIG. 19 is a front elevation view of the rear cutter blade of the dowel maker shown in FIG. 1.

DETAILED DESCRIPTION OF DRAWINGS

Figure 1:
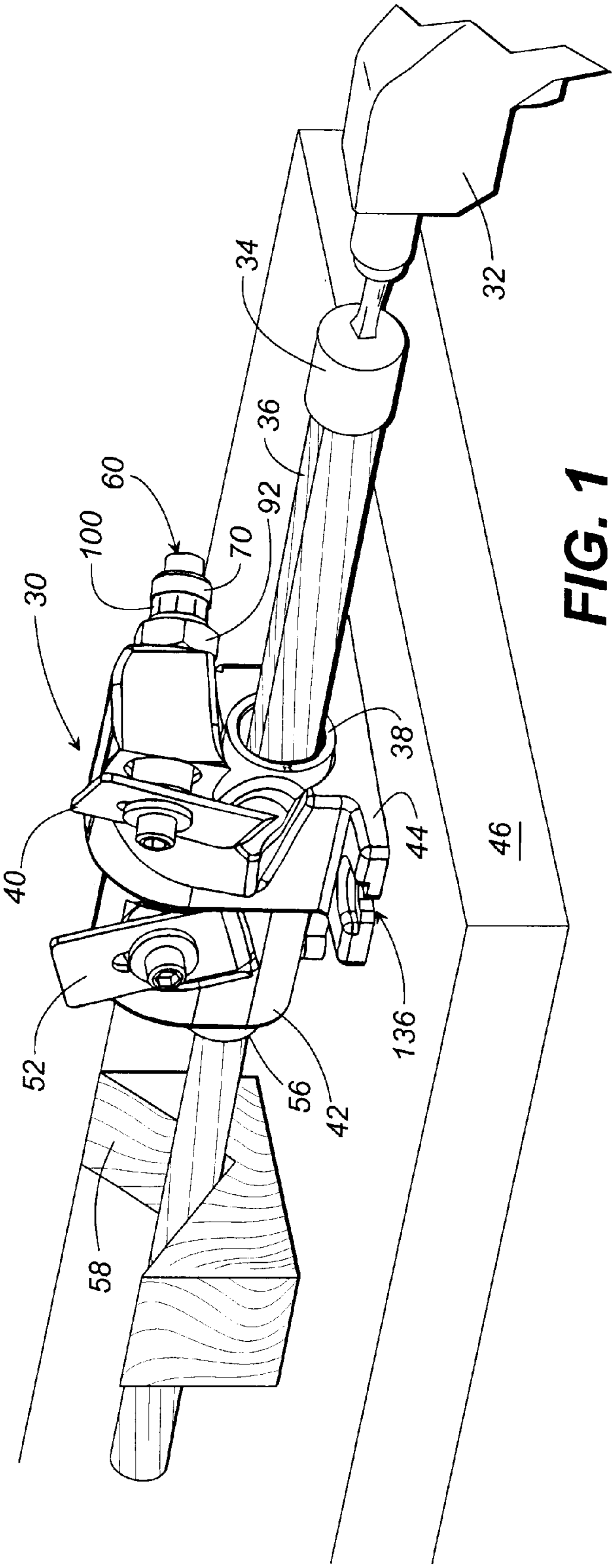
FIG. 1 is a perspective view of the dowel maker of this invention resting on a bench with a workpiece being driven through the dowel maker with an electric drill.

Dowel maker 30 is shown in use in FIG. 1 with an electric drill 32 driving a square wrench socket 34 within which one end of a square cross-section workpiece 36 is received. After entering the dowel maker 30, the workpiece 36 is initially engaged by front blade 40. Front insert guide 38 is used for producing dowel diameters smaller than the largest that dowel maker 30 is capable of producing, and is held within dowel maker body 42. Body 42 has a base 44 that rests on and is secured to a work bench top 45 or other appropriate secure location. Non-square workpieces are also usable, provided that their greatest cross-sectional diameter is small enough to fit into the front insert guide 38 (or the body 42 when a front insert guide 38 is not used).

Figure 7:
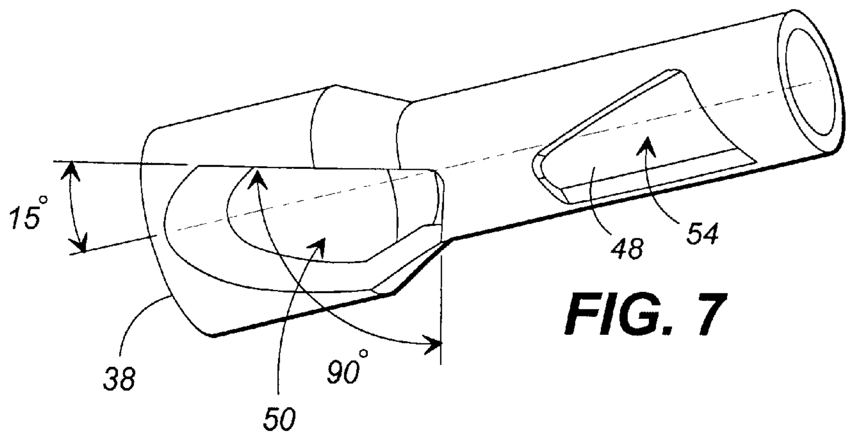
FIGS. 7 and 8 are perspective views of a front insert guide usable in the dowel maker shown in FIG. 1 to cut a smaller diameter dowel.
Figure 8:
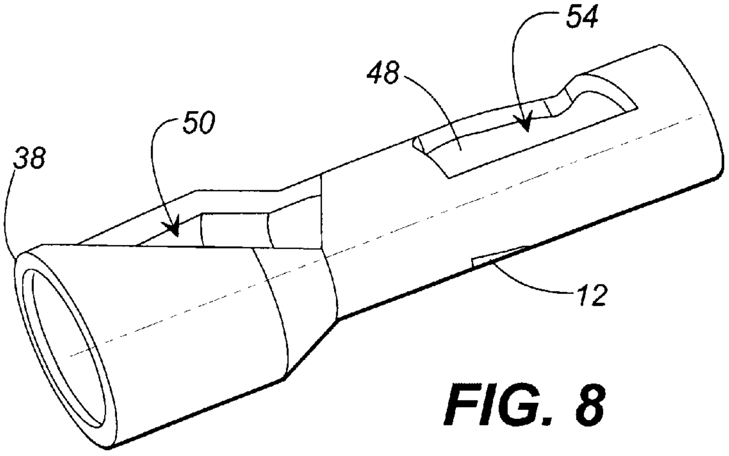

After being formed by front blade 40 into an oversize round shape, workpiece 36 then passes into a reduced diameter portion 48 of insert 38 (if an insert is in use). (Insert 38 is shown separately in FIGS. 7 and 8). Front blade 40 protrudes into front insert guide 38 through front opening 50.

Within the reduced diameter portion 48 of insert 38, workpiece 36 encounters rear blade 52, which protrudes through rear opening 54 of insert 38 and is positioned to take a light slicing 90 or shearing cut that produces a smooth, accurately sized cylindrical surface on workpiece 36, which then exits the dowel maker 30 through rear guide 56 that has an internal diameter just larger than the size of dowel being produced.

In order to prevent the dowel end of workpiece 36 from whipping, it is frequently desirable to support it with a series of v-shaped wooden blocks 58 resting on the workbench top 46 at intervals behind dowel maker 30. Only one such block is shown in FIG. 1, but additional blocks may be desirable. Only one size of v-block is necessary to accommodate all sizes of dowel produced by dowel maker 30, because the block can be rotated until diagonally opposing corners make light contact with the dowel of the diameter being produced.

Blades 40 and 52 are mounted on dowel maker 30 with micro-adjust blade-holding assemblies 60 and 62. Micro-adjust assemblies 60 and 62 make it possible to reposition blades 40 and 52 normal to the plane of the back of the blades by very small, accurately controlled, increments during setup of dowel maker 30. They also make it possible to reposition blades 40 and 52 by larger distances when dowel maker 30 is being set up for production of a different dowel diameter.

Figure 2:
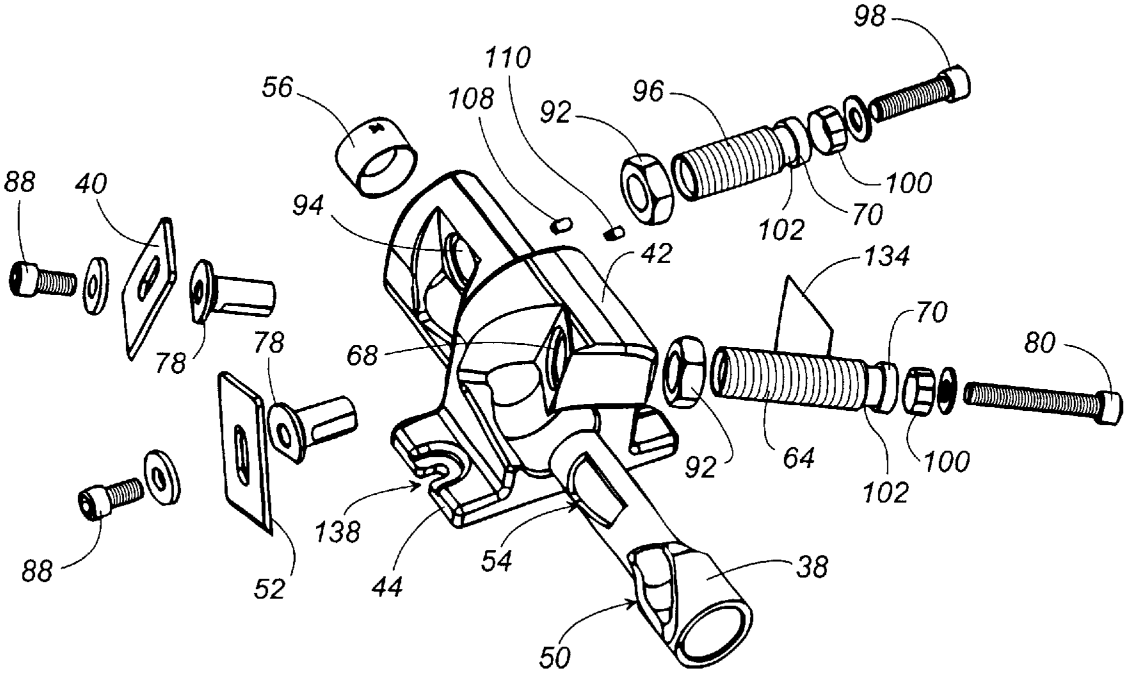
FIG. 2 is an exploded perspective view of the dowel maker shown in FIG. 1.
Figure 12:
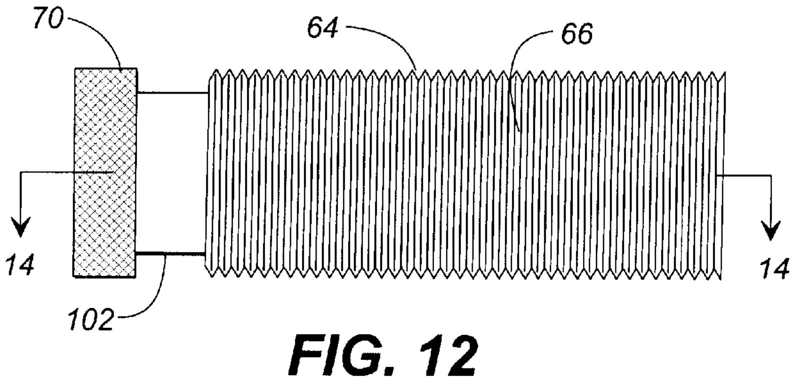
FIGS. 12, 13 and 14 are a side elevation view, an end view, and a section taken along line 14—14 in FIG. 12, of the bush seat components of the blade adjustment assemblies of the dowel maker shown in FIG. 1.
Figure 13:
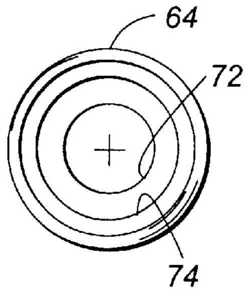
Figure 14:
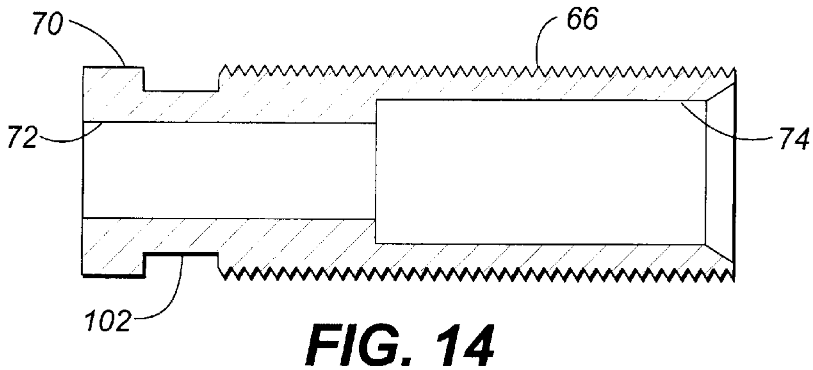
Figure 20:
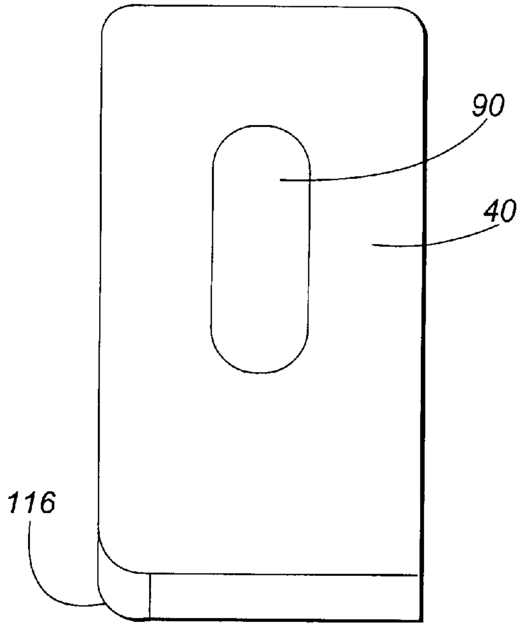
FIG. 20 is a front elevation view of the front cutter blade of the dowel maker shown in FIG. 1.
Figure 21:
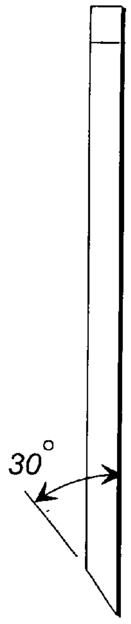
FIG. 21 is a right side elevation view of either of the cutter blades shown in FIG. 19 and 20.
Figure 22:
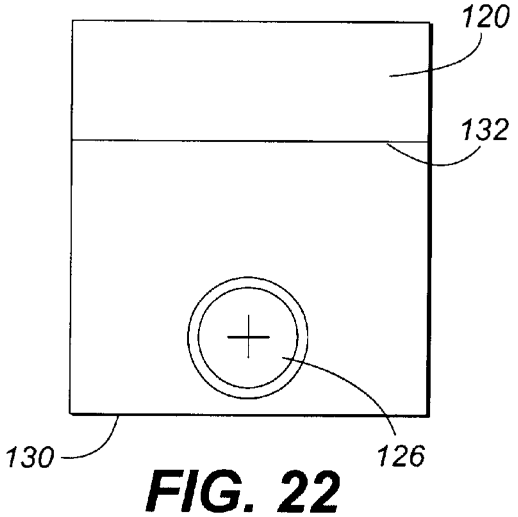
FIGS. 22, 23 and 24 are front elevation side elevation, and perspective views, respectively, of the blade setting gauge of the present invention.
Figure 23:
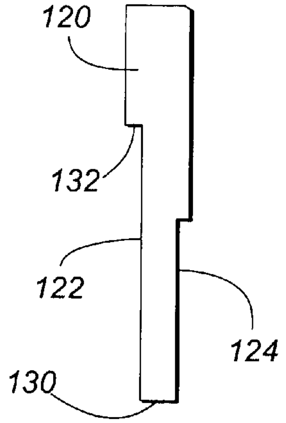
Figure 24:
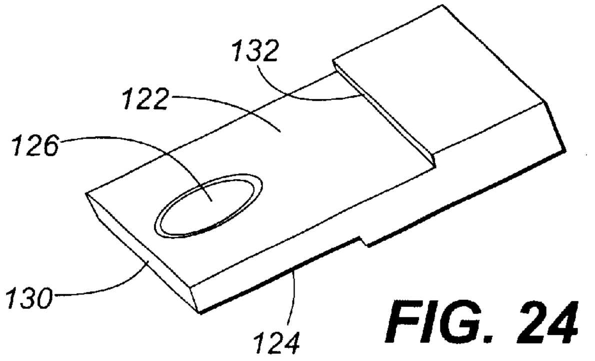

Front micro-adjust blade holding assembly 60 is shown exploded apart in FIG. 2. Assembly 60 includes a front bush seat 64 (also shown in FIGS. 12, 13, and 14), which bush seat 64 is generally cylindrical in shape and has an external threaded region 66 that threads into a threaded bore 68 in body 42. Front bush seat 64 is manipulated by a knurled region 70. Bush seat 64 is penetrated by a smaller diameter bore 72 and a larger diameter coaxial bore 74. Bore 74 receives the shank 76 of blade holding bush 78 (shown approximately full size in FIGS. 15, 16, 17, and 18). A cap screw 80 passes through bore 72 in front bush seat 64 and into an one end of internally threaded bore 82 in bush 78. Blade 40 is secured to the face 84 of flange 86 of bush 78 with a capscrew 88 that passes through a washer and an oval or elongated hole 90 in blade 40 and into the other end of threaded bore 82 in bush 78. Thus, blade 40 is securely attached to bush 78 with capscrew 88 passing into threaded bore 82 from one direction, and bush 78 is secured to front bush seat 64 with cap screw 80, which passes into threaded bore 82 in bush 78 from the other direction.

As noted above, front bush seat 64 is threaded into threaded bore 68 in body 42. Front bush seat 64 is locked in position within body 42 by jam nut 92, that is threaded onto front bush 64 and locked against body 42.

Micro-adjust blade holding assembly 62 for rear blade 52 is substantially similar to the just-described assembly 60. Each of jam nuts 92, cap screws 88, and bushes 78 are identical in the micro-adjust assemblies 60 and 62. However, because body 42 in the embodiment of this invention illustrated in the figures is not as thick where it is penetrated by threaded bore 94, rear bush scat 96 may be shorter, but otherwise identical to front bush seat 64, and cap screw 98 may therefore be shorter than cap screw 80.

A scale 100 bearing markings that make it possible to keep track of the rotational position of bush seats 64 and 96 may be positioned on each of the bush seats 64 and 96 in an annular depression 102 just in front of knurled region 70 on each of the bush seats.

Figure 3:
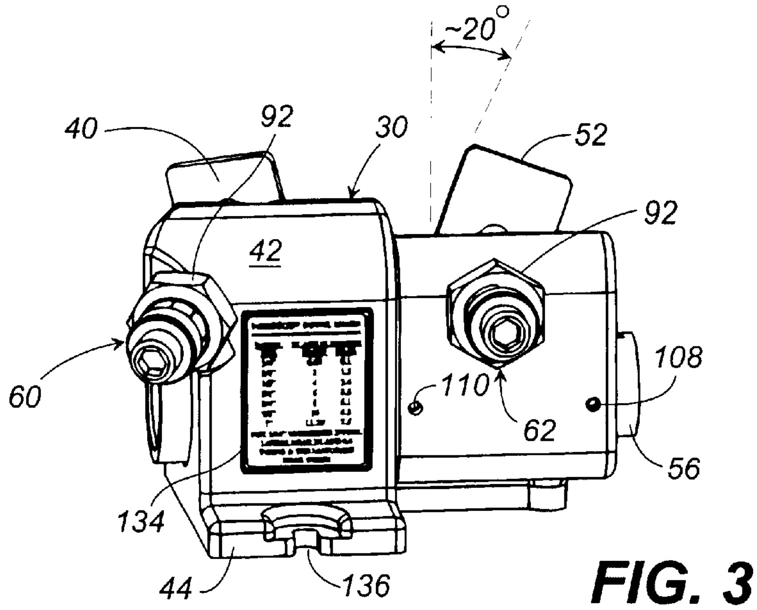
FIG. 3 is a perspective view of the right side of the dowel maker shown in FIG. 1.
Figure 11:
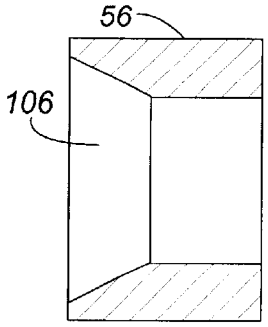

As will be understood by those skilled in the art, front insert guides 38 and rear guides 56 having a variety of internal diameters may be used in body 42 in order to produce different desired diameters of dowels. As can be seen by reference to the figures, particularly including FIG. 8, and as was noted above, the entrance diameter 104 of insert 38 is large enough to accommodate a workpiece having a square cross-section larger, typically by approximately one eighth inch, than the desired diameter of dowel to be produced. This entrance diameter 104 transitions to a smaller diameter 48. Just beyond rear cutter 52, and after exiting the front guide 38 when it is used, the workpiece enters a funnel or conically shaped entrance 106 in rear guide 56 (visible in FIG. 11, which shows the cross-sectional shape of rear guide 56). The exit bore 114 of rear guide 56 is just larger in diameter than the finished diameter desired for a particular pair of insert 38 and rear guide 56. It is frequently desirable to produce a dowel smaller in diameter by a small increment than a particular nominal size, so that the dowel can slip or turn within a hole of the nominal size. For instance, it may be desirable to make dowels 1⁄16 inch smaller in diameter than nominal sizes one inch, ¾ inch, ½ inch in diameter and so forth. The blade adjustment capabilities of dowel maker 30 utilizing front and rear micro-adjust assemblies 60 and 62 make it possible to produce such smaller diameter dowels by adjusting the blades 40 and 52 to produce the desired smaller diameter and by replacing rear guide 56 with a guide 56 having a smaller internal diameter, typically 1⁄16 inch smaller than the nominal diameter. It is possible to produce a dowel 1⁄16 inch smaller in diameter using a smaller rear guide 56 without using a different front insert guide. Thus, for instance, with a front insert guide 38 sized for production of a ¾ inch diameter dowel, two rear guides 56 can be used alternatively. One is sized to produce a ¾ inch dowel and the other is smaller for producing a 11⁄16 inch dowel. Rear guide 56 is locked within body 42 with a set screw 108 threaded into body 42 to bear against guide 56, as may be seen in FIG. 3. Similarly, a set screw 110 also threaded into body 42 bears against insert 38 to secure it in place. A recess 12 may be formed in insert 38 (see FIG. 8) to receive set screw 110 in order to insure proper rotational position of insert 38 and help secure it in a fully seated position.

Figure 4:
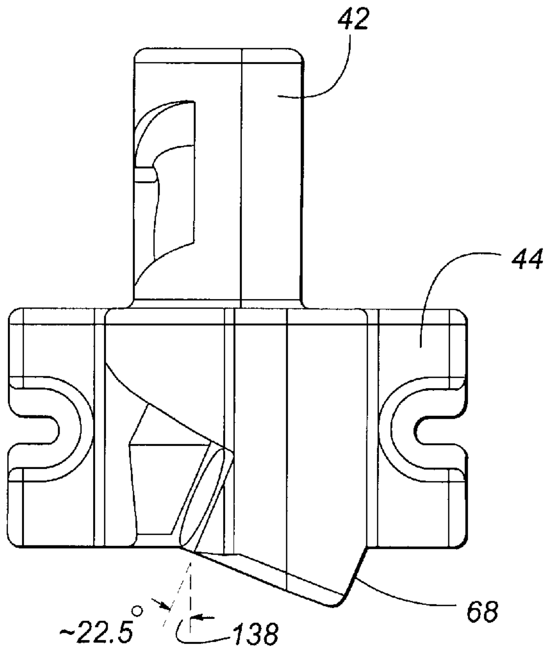
FIGS. 4, 5 and 6 are, respectively, a top plan view, a front elevation view, and a section view taken along line 6—6 in FIG. 5, of the body of the dowel maker shown in FIG. 1.
Figure 5:
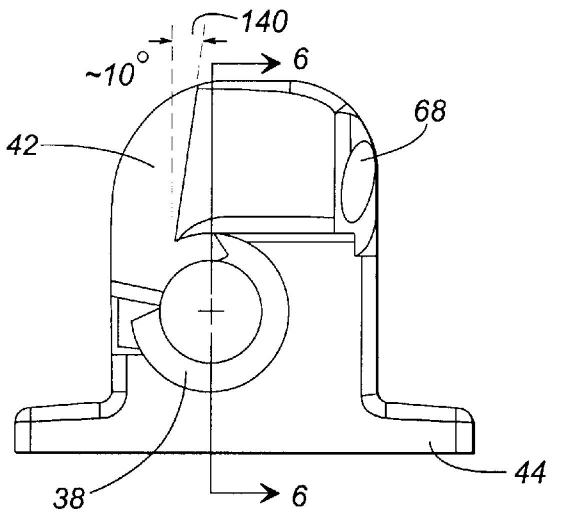
Figure 6:
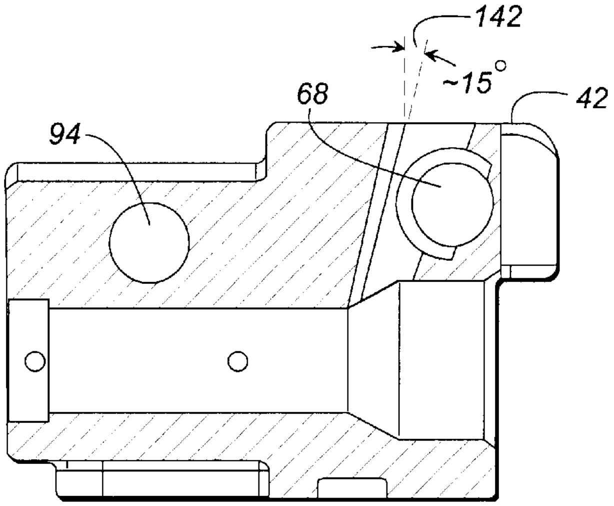
Figure 9:
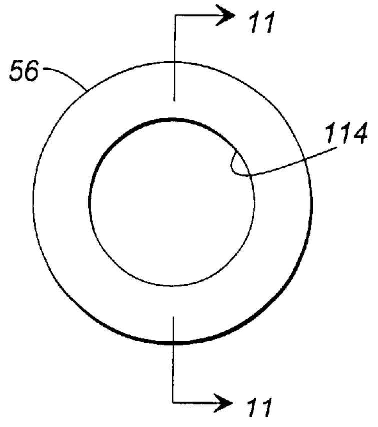
FIGS. 9, 10 and 11 are, respectively, an end view, a side elevation view, and a section taken along line 11—11 in FIG. 9, of a rear guide usable in the dowel maker shown in FIG. 1 to form reduced diameter dowels.
Figure 10:
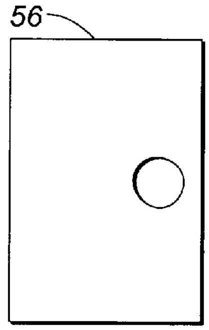

As will be appreciated by reference to the figures, particularly including FIGS. 4 and 5, front blade 40 is positioned during operation of dowel maker 30 to take a very aggressive cut. This is accomplished by turning the blade 40 so that the plane of its back forms an angle 138 (visible in FIG. 4) on the order of approximately 22.5 degrees relative to the longitudinal axis of the workpiece 36 and insert guide 38 and rear guide 56 as viewed from above. Blade 40 is also tilted or rotated, through an angle 142, which may be approximately 10 degrees, off of a vertical position as viewed from the front (FIG. 5) and by pivoting or leaning it forward within the plane of the blade (thereby raising the curved, trailing corner 116) approximately 15 degrees, shown as agile 142 in FIG. 6. Each of blades 40 and 52 are sharpened at a bevel angle of approximately a 30 degrees, and the trailing corner 116 of blade 40 is rounded.

Blade 52 is positioned parallel to the longitudinal axis of the workpiece 36 and front guide 38 and rear guide 56, but it is pivoted back approximately 20 degrees from an upright position, so that the cutting aiTis 118 of blade 52 forms approximately a 20-degree angle relative to the longitudinal axis of the workpiece. This makes possible a very fine shearing cut that produces an extremely smooth face on the dowel being produced.

Appropriate positions for the blades 40 and 52 utilizing blade holding assemblies 60 and 62 may be noted on a reference plate 134 attached to body 42 of dowel cutter 30. This makes it easy to adjust the micro-adjust assemblies 60 and 62 when switching dowel diameters to be produced on dowel maker 30 by counting the number of revolutions (and fractions of revolutions) of bush seats 64 and 96 within body 42, which moves blades 40 and 52 normal to the plane of the backs of the blades (and therefore along the longitudinal axes of cap screws 88 which secure blades 40 and 52).

Proper operation of the dowel cutter 30 requires that the projection of blades 40 and 52 from their respective blade holding assemblies 60 and 62 be correct. Sharpening the blades requires that they be removed from bushes 78, upsetting their required projection from bushes 78, and shortening them, making it necessary to provide elongated holes 90 through which cap screws 88 secure the blades 40 and 52.

Accurate positioning may be achieved utilizing a blade setting gauge 120 having a longer ledge 122 on one side, a shorter ledge 124 on the other side, and a rare earth magnet 126 positioned within the jig 120, so that one of the magnet's faces is coplanar with each of the recesses 124 and 126.

Figure 25:
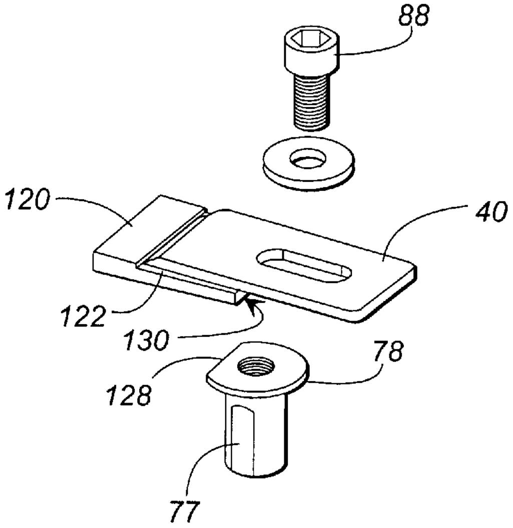
FIG. 25 is an exploded perspective view showing the blade setting gauge shown in FIGS. 22–24 in use.

As will be appreciated by reference FIG. 25, the front blade 40 may be properly positioned on bush 78 by placing the sharpened end of blade 40 within ledge 122 and securing bush 78 to blade 40 with cap screw 88 with the flat edge 128 of flange 84 of bush 78 in contact with the end 130 of gauge 120. Blade 40 will then project the desired distance beyond the flat face 128 of the flange 82 of bush 78, which distance is established by the distance between the end 130 of gauge 120 and stop 132 at the remote portion of ledge 122. Similarly, shorter projection of blade 52 may be established by instead positioning it within ledge 124 on the other side of gauge 120. Opposed flat regions 77 on opposite sides of shank 76 of bush 78 make it possible to hold bush 78 in vise or wrench jaws (not shown) and prevent it from rotating while blade 40 or 52 is being attached with cap screw 88.

In addition to the slots .1 36 in base 44 for use in bolting or screwing dowel maker 30 to a bench top 46 or other structure., with screws or bolts not shown, a threaded bore, also not shown, may be formed in the bottom of body 42 of dowel maker 30 so that a temporary or permanent bolt or other mounting structure may be passed through work bench top 46 and into body 42 of dowel maker 30 in order to temporarily or permanently secure it in place.

Those skilled in the art will understand that numerous alternative materials are available for producing the components of dowel maker 30. Body 30 can be cast reinforced polymeric material, cast iron or cast aluminum among other alternatives, suitably finished to reduce wear and prevent discoloration from being imparted to the dowel. Blades 40 and 52 could be carbide or a variety of tool steels, including A2 tool steel. Guides 38 and 56 may be machined or otherwise produced of brass, aluminum and steel, also suitably finished to reduce wear and prevent discoloration from being imparted to the dowel. Magnet 126 should preferably be a rare earth magnet simply press fit into gauge 120.

As will be appreciated by those skilled in the art, numerous modifications can be made in this invention without departing from the spirit of the invention as described and illustrated here or the scope of the following claims. For instance, such a dowel maker could be made for the production of a single size dowel without the use of inserts. Additionally, the orientation of the blades could be changed and other shapes of blades, such as curved blades could be used, provided that blade geometry and location is controlled in a manner providing the needed types of cuts. Alternative materials could be used to form the body and other components, and the body could be produced in an entirely different shape provided that it still generally positions the blades relative to the workpiece as described above.

We claim:

1. A dowel maker, comprising:

a first blade having a generally flat back defining a blade plane positioned at an acute angle relative to a longitudinal axis of the dowel maker to form a rotating workpiece into a cylinder having a first diameter and p1 a second blade positioned to reduce the diameter of the cylinder to a second, finished diameter.

2. A dowel maker, comprising:

a guide having a bore therethrough for receiving a workpiece and having an opening communicating with the bore, and a flat blade having a single bevel having a cutting arris with a straight portion and a curved portion positioned within the opening in the guide to engage the workpiece and form a dowel.

3. A dowel maker, comprising:

a guide having a bore having a longitudinal axis for receiving a workpiece, a blade having a generally flat back defining a blade plane positioned at an acute angle relative to the longitudinal axis, adjustably positionable relative to the guide so that the blade position can be changed along an axis normal to the blade plane.

4. A dowel maker, comprising:

a body having at least one bore for receiving a workpiece, the bore having a longitudinal axis, a first blade:

having a generally flat back defining a blade plane positioned at a first acute angle relative to the longitudinal axis, adjustably secured to the body so that the first blade position can be changed along an axis normal to the blade plane, and having a cutting aiTis positioned to contact and cut a workpiece positioned within the bore when the work, piece and dowel maker are rotated relative to each other.

5. The dowel maker of claim 4, further comprising:

a front guide having a bore having a longitudinal axis for receiving the workpiece, the front guide secured to the body at least partially within the bore in the body.

6. The dowel maker of claim 4, further comprising a second blade adjustably secured to the body and having a cutting anris positioned to contact and cut the workpiece after the workpiece is cut by the first blade.

7. The dowel maker of claim 6, further comprising a rear guide for receiving the workpiece after it is cut by the second blade.

8. The dowel maker of claim 6, wherein the first blade cutting arris has a curved portion.

9. The dowel maker of claim 8, wherein the second blade cutting arris is straight.

10. The dowel maker of claim 4, further comprising a workpiece drive comprising a drive body having a square recess for receiving the workpiece and a drive shank attached to the drive body for attachment to a motor for rotating the drive shank and body.

11. The dowel maker of claim 4, wherein at least a portion of the cutting arris is positioned at a second acute angle relative to the longitudinal axis while the plane of the blade remains at the acute angle relative to the longitudinal axis.

12. A dowel maker, comprising:

a body having at least one bore for receiving a workpiece, the bore having a longitudinal axis, a first blade having a generally flat back defining a blade plane positioned at an acute angle relative to the longitudinal axis and a cutting arris positioned to contact and cut the workpiece, and wherein the first blade is mounted on a micro-adjust assembly for securing the first blade in multiple positions along an adjustment axis normal to the blade plane so that a portion of the first blade is positioned within the bore when the workpiece and dowel maker are rotated relative to each other.

13. A dowel maker, comprising:

a body having at least one bore for receiving a workpiece, the bore having a longitudinal axis, a first blade having a generally flat back defining a blade plane positioned at an acute angle relative to the longitudinal axis and a cutting arris positioned to contact and cut the workpiece, and wherein the first blade is mounted on a first micro-adjust assembly for securing the first blade in multiple positions along an adjustment axis normal to the blade plane so that a portion of the First blade is positioned within the bore when the workpiece and dowel maker are rotated relative to each other, and a second blade having a generally flat back defining a blade plane and wherein the second blade is mounted on a second micro-adjust assembly for securing the second blade in multiple positions along an adjustment axis generally orthogonal to the blade plane of the second blade.

14. The dowel maker of claim 13, wherein the second blade adjustment axis is approximately orthogonal to the longitudinal axis.

15. A dowel maker, comprising:

a body having at least one bore for receiving a workpiece, the bore having a longitudinal axis, a first blade having a generally flat back defining a blade plane and a cutting arris positioned to contact and cut the workpiece, wherein the first blade is mounted on a micro-adjust assembly for securing the first blade in multiple positions along an adjustment axis generally orthogonal to the plane of the blade so that a portion of the first blade is positioned within the bore when the workpiece and dowel maker are rotated relative to each other, and wherein the micro-adjust assembly comprises a bush to which the first blade is secured, a bush seat adjustably positionable within the body, and a screw for securing the bush to the bush seat.

16. The dowel maker of claim 15, wherein the bush seat is externally threaded, is received in a threaded bore in the body, and is secured in position in the threaded bore with a jam nut.

17. The dowel maker of claim 16, wherein the bush seat is marked with indicia of its rotational position.

18. The dowel maker of claim 16, wherein the bush seat has a knurled region for grasping to rotate the bush seat.

19. A dowel maker, comprising:

a body having at least one bore for receiving a workpiece, the bore having a longitudinal axis, a first blade having a generally flat back defining a blade plane and a cutting arris positioned to contact and cut the workpiece, and wherein the first blade is mounted on a first micro-adjust assembly for securing the first blade in multiple positions along an adjustment axis generally orthogonal to the plane of the blade so that a portion of the first blade is positioned within the bore when the workpiece and dowel maker are rotated relative to each other;

a second blade having a generally flat back defining a blade plane, and wherein the second blade is mounted on a second micro-adjust assembly for securing the second blade in multiple positions along an adjustment axis generally orthogonal to the blade plane of the second blade, and wherein each micro-adjust assembly comprises a bush to which the second blade is secured, a bush seat adjustably positionable within the body, and a screw for securing the bush to the bush seat.

20. The dowel maker of claim 19, wherein each bush seat is externally threaded, is received in a threaded bore in the body, and is secured in position in the threaded bore with a jam nut.

21. The dowel maker of claim 20, wherein each bush seat is marked with indicia of its rotational position.

22. The dowel maker of claim 20, wherein each bush scat has a knurled region for grasping to rotate the bush seat.

23. The dowel maker of claim 19, further comprising a gauge for positioning either of the first or second blades on the bush, the gauge comprising a gauge body defining a first ledge having a face and a magnet positioned in the gauge body coplanar with the first ledge face for holding one of the blades in position on the first ledge.

24. The dowel maker of claim 23, wherein the gauge further comprises a second ledge having a face and the magnet is also coplanar with the second ledge face for holding the other of the blades in position on the second ledge.

25. A dowel maker, comprising:

a body having at least one bore for receiving a workpiece, the bore having a longitudinal axis, a first blade having a generally flat back defining a blade plane and a cutting arris positioned to contact and cut the workpiece, wherein the first blade is mounted on a micro-adjust assembly for securing the first blade in multiple positions along an adjustment axis generally orthogonal to the plane of the blade so that a portion of the first blade is positioned within the bore when the workpiece and dowel maker are rotated relative to each other, and wherein the micro-adjust assembly comprises:

a bush having:

a generally round shank penetrated by a threaded bore and having at least two opposed external flat regions for securing the shank between opposed wrench, vise or similar faces, and a flange attached to the shank and against which the blade is secured with a first screw that passes through the blade and into the threaded bore in the bush, and an externally threaded bush seat having a larger longitudinal bore within which the bush shank is received and a coaxial smaller bore through which a second screw extends into the shank to secure the bush to the bush seat.

26. The dowel maker of claim 25, wherein the micro-adjust assembly further comprises a jamb nut on the bush seat thread for locking the bush seat in position in the body.

27. A dowel maker, comprising:

a body having at least one bore for receiving a workpiece, the bore having a longitudinal axis, a first blade having a generally flat back defining a blade plane and a cutting arris positioned to contact and cut the workpiece, and wherein the first blade is mounted on a first micro-adjust assembly for securing the first blade in multiple positions along an adjustment axis generally orthogonal to the plane of the blade so that a portion of the first blade is positioned within the bore when the workpiece and dowel maker are rotated relative to each other;

a second blade having a generally flat back defining a blade plane and wherein the second blade is mounted on a second micro-adjust assembly for securing the second blade in multiple positions along an adjustment axis generally orthogonal to the blade plane of the second blade; and wherein each micro-adjust assembly comprises:

a bush having:

a generally round shank penetrated by a threaded bore and having at least two opposed external flat regions for securing the shank between opposed wrench, vise or similar faces, and a flange attached to the shank and against which the blade is secured with a first screw that passes through the blade and into the threaded bore in the bush, and an externally threaded bush seat having a larger longitudinal bore within which the bush shank is received and a coaxial smaller bore through which a second screw extends into the shank, to secure the bush to the bush seat.

28. The dowel maker of claim 27, wherein the micro-adjust assembly further comprises a jamb nut on the bush seat thread for locking the bush seat in position in the body.

29. A dowel maker, comprising:

a body having a base for attachment to a stationary object, secured to the body, a front guide for receiving a workpiece and having a larger front bore centered on a longitudinal axis and a smaller, coaxial rear bore and an opening communicating with the larger bore, a first blade having a cutting arris and a generally flat back defining a blade plane and secured to the body with a first micro-adjust assembly so that the first blade cutting arris is positioned within the opening in the front guide to contact and cut a workpiece positioned within the front guide when the workpiece is rotated relative to the dowel maker and so that the first blade is adjustable along a first adjustment axis orthogonal to the first blade plane and the first adjustment axis is no orthogonal to the longitudinal axis, a second blade having a cutting arris and a generally flat back defining a second blade plane and secured to the body with a second micro-adjust assembly so that the second blade cutting arris is positioned behind the front guide to contact and cut the workpiece so that the second blade is adjustable along a second adjustment axis orthogonal to the first blade plane and orthogonal to the longitudinal axis, the first and second micro-adjust assemblies each comprising:

a bush having:

a generally round shank penetrated by a threaded bore and having at least two opposed external flat regions for securing the shank between opposed wrench, vise or similar faces, and a flange attached to the shank and against which the blade is secured with a first screw that passes through the blade and into the threaded bore in the bush, and an externally threaded bush seat having a larger longitudinal bore within which the bush shank is received and a coaxial smaller bore through which a second screw extends into the shank to secure the bush to the bush seat.

30. The dowel maker of claim 29, further comprising a gauge for positioning either of the first or second blades on their respective bush, the gauge comprising a gauge body defining a first ledge having a face on one side of the body and a second ledge having another face on a second side of the body and a magnet positioned in the gauge body between the first and second faces for holding one of the blades in position on either of the ledges.

31. A method for forming a dowel from an elongated wooden workpiece having a generally square cross section and a longitudinal axis, comprising rotating the workpiece simultaneously:

(a) against a first blade, having a generally flat back defining a blade plane positioned at an acute angle relative to the longitudinal axis and adjustably positionable so that the first blade position can be changed along an axis normal to the blade plane in order to produce a first dowel diameter and (b) against a second blade to reduce the first dowel diameter to a finished diameter.

32. The method of forming a dowel of claim 31, further comprising positioning each of the first and second blades prior to rotating the workpiece utilizing a first micro-adjust assembly to which the first blade is secured and a second micro-adjust assembly to which the second blade is secured.

33. A method for forming a dowel from an elongated wooden workpiece having a generally square cross section and a longitudinal axis, comprising:

rotating the workpiece simultaneously, (a) against a first blade in order to produce a first dowel diameter; and (b) against a second blade to reduce the first dowel diameter to a finished diameter;

positioning each of the first and second blades prior to rotating the workpiece utilizing a first micro-adjust assembly to which the first blade is secured and a second micro-adjust assembly to which the second blade is secured; and securing the first blade to the first micro-adjust assembly before adjusting the first micro-adjust assembly by positioning the first blade on a first ledge of a blade gauge in order to establish an amount of projection of the first blade from the first micro-adjust assembly.

34. A method for forming a dowel from an elongated wooden workpiece having a generally square cross section and a longitudinal axis, comprising:

rotating the workpiece simultaneously, (a) against a first blade in order to produce a first dowel diameter; and (b) against a second blade to reduce the first dowel diameter to a finished diameter;

positioning each of the first and second blades prior to rotating the workpiece utilizing a first micro-adjust assembly to which the first blade is secured and a second micro-adjust assembly to which the second blade is secured; and securing the second blade to the second micro-adjust assembly before adjusting the second micro-adjust assembly by positioning the second blade on a second ledge of the blade gauge in order to establish another amount of projection of the second blade from the second micro-adjust assembly.

35. A dowel maker, comprising:

a first blade positioned to form a rotating workpiece into a cylinder having a first diameter; and a second blade positioned to make a finishing cut reducing the first diameter to a second diameter, wherein the second blade further includes a generally flat back defining a blade plane positioned parallel to a longitudinal axis of the dowel maker and a cutting arris positioned at an acute angle relative to the longitudinal axis to reduce the diameter of the cylinder to a second diameter having a finished surface.

36. The dowel maker of claim 35, wherein the second blade can be adjustably postionable along an axis normal to the blade plane.

37. The dowel maker of claim 35, further comprising:

a microadjust assembly for securing the second blade in multiple positions along an adjustment axis generally orthogonal to the blade plane.

38. The dowel maker of claim 35, further comprising:

a microadjust assembly for securing the first blade in multiple positions along an adjustment axis generally orthogonal to the blade plane.

39. The dowel maker of claim 35, wherein the first blade further comprises a cutting arris having a rounded corner.

40. The dowel maker of claim 35, wherein the first blade further comprises a generally flat back defining a plane positioned at a first acute angle relative to the longitudinal axis.

41. The dowel maker of claim 40, wherein at least a portion of the first blade cutting arris is straight and is positioned at a second acute angle relative to the longitudinal axis while the plane of the blade remains at the first acute angle relative to the longitudinal axis.

* * * * *